United States Patent
Batista et al.

(10) Patent No.: US 11,510,439 B2
(45) Date of Patent: Nov. 29, 2022

(54) PRODUCT RECOGNITION IN AEROSOL GENERATING DEVICES

(71) Applicant: PHILIP MORRIS PRODUCTS S.A., Neuchatel (CH)

(72) Inventors: Rui Batista, Morges (CH); Serge Maeder, Auvernier (CH)

(73) Assignee: Philip Morris Products S.A., Neuchâtel (CH)

( * ) Notice: Subject to any disclaimer, the term of this patent is extended or adjusted under 35 U.S.C. 154(b) by 479 days.

(21) Appl. No.: 15/575,184

(22) PCT Filed: Jun. 9, 2016

(86) PCT No.: PCT/IB2016/053407
§ 371 (c)(1),
(2) Date: Nov. 17, 2017

(87) PCT Pub. No.: WO2016/199066
PCT Pub. Date: Dec. 15, 2016

(65) Prior Publication Data
US 2019/0053538 A1  Feb. 21, 2019

(30) Foreign Application Priority Data

Jun. 12, 2015 (EP) .................................. 15171975

(51) Int. Cl.
A24F 40/53 (2020.01)
A24F 40/42 (2020.01)
(Continued)

(52) U.S. Cl.
CPC .............. *A24F 40/53* (2020.01); *A24F 40/42* (2020.01); *A24F 40/51* (2020.01);
(Continued)

(58) Field of Classification Search
None
See application file for complete search history.

(56) References Cited

U.S. PATENT DOCUMENTS 6,422,061 B1 * 7/2002 Sunshine ............. G01N 29/022
340/603
2003/0168057 A1  9/2003 Snyder et al.
(Continued)

FOREIGN PATENT DOCUMENTS

CN   102265144 A   11/2011
CN   103266539 A   8/2013
(Continued)

OTHER PUBLICATIONS

Third Party Observation for EP 16742393.8, dated Sep. 13, 2018, 6 pgs.
(Continued)

*Primary Examiner* — Phu H Nguyen
(74) *Attorney, Agent, or Firm* — Mueting Raasch Group

(57) ABSTRACT

A system includes a container housing an aerosol generating substrate and a product identifying compound associated with the container. The system further includes an electronic article configured to receive the container. The electronic article includes a sensor configured to detect the product identifying compound.

14 Claims, 3 Drawing Sheets

(51) Int. Cl.
*A24F 40/51* (2020.01)
*G06K 7/10* (2006.01)
*G06K 19/07* (2006.01)
*A24F 40/485* (2020.01)

(52) U.S. Cl.
CPC ..... *G06K 7/10366* (2013.01); *G06K 19/0723* (2013.01); *A24F 40/485* (2020.01)

(56) References Cited

U.S. PATENT DOCUMENTS

| | | | |
|---|---|---|---|
| 2005/0280544 A1 | 12/2005 | Mishelevich | |
| 2007/0006883 A1* | 1/2007 | Kolb | A61M 15/002 128/205.24 |
| 2013/0220315 A1* | 8/2013 | Conley | A61M 11/042 128/202.21 |
| 2015/0116093 A1 | 4/2015 | Swager et al. | |
| 2015/0136158 A1* | 5/2015 | Stevens | A61M 15/06 131/329 |

FOREIGN PATENT DOCUMENTS

| | | |
|---|---|---|
| CN | 103844360 A | 6/2014 |
| CN | 203633514 U | 6/2014 |
| CN | 103932406 A | 7/2014 |
| CN | 203692546 U | 7/2014 |
| CN | 104544570 A | 4/2015 |
| WO | WO 2010/003480 A1 | 1/2010 |
| WO | WO 2010/064976 A1 | 6/2010 |
| WO | WO 2013/034456 A1 | 3/2013 |
| WO | WO 2013/098398 A2 | 7/2013 |
| WO | WO 2014/199233 A2 | 12/2014 |
| WO | WO 2015/082560 A1 | 6/2015 |

OTHER PUBLICATIONS

Second Office Action for Chinese Application No. 201680030526.1, issued by the China National intellectual Property Administration; dated Sep. 2, 2020; 22 pgs. including English Translation.
Israeli Office Action for IL 255490, issued by the Israel Patent Office dated Mar. 15, 2021; 11 pgs.
International Search Report and Written Opinion, issued by the European Patent Office as the International Search Authority, for PCT/IB2016/053407, dated Sep. 20, 2016, 9 pgs.
International Preliminary Report on Patentability issued by the European Patent Office as the International Search Authority, for PCT/IB2016/053407, dated May 17, 2017: 6 pgs.
European Extended Search Report, issued by the European Patent Office for EP 15171975.4, dated Dec. 16, 2015.
Written Opinion issued by the Singapore Patent Office for Application No. 11201708938S dated Mar. 23, 2020; 6 pgs.
Aeroqual™ gas monitor; Mar. 3, 2015; https://web/archive.org/web/20150303152316/http://www.aeroqual.com:80/product/sm70-fixed-gas-monitor; 5 pgs.
Chinese Office Action issued for CN Application No. 201680030526.1, by the China National Intellectual Property Administration, dated Dec. 19, 2019; 19 pgs. including English Translation.

* cited by examiner

PRODUCT RECOGNITION IN AEROSOL GENERATING DEVICES

This application is the § 371 U.S. National Stage of International Application No. PCT/IB2016/053407, filed 9 Jun. 2016, which claims the benefit of European Patent Application No. 15171975.4, filed 12 Jun. 2015.

This disclosure relates to aerosol-generating devices. Aspects of the invention find particular application in relation to aerosol-generating devices including a consumable aerosol generating substrate. Examples of the invention described relate to electronic smoking articles.

Electronic smoking articles are typically configured to receive a container housing an aerosol generating substrate. The containers can be replaced to replenish the supply of aerosol generating substrate following use or depletion of the substrate in previously used container.

The use of containers having associated RFID tags, with smoking articles having corresponding RFID readers, has been proposed to allow the smoking article to identify the aerosol generating substrate housed in the container and to verify authenticity of the container to prevent counterfeiting. However, such RFID systems will not effectively identify the contents of the container or verify authenticity of the container if a consumer refills the container with an aerosol generating substrate that is different from the substrate originally housed in the container.

One object of the present invention is to manufacture an electronic aerosol-generating article and system having enhanced ability to verify aerosol generating contents of a container for use with the aerosol-generating article. Other objects of the present invention will be evident to those of skill in the art upon reading and understanding the present disclosure, which includes the claims that follow and the accompanying drawings.

In one aspect of the present invention, an aerosol-generating system includes a container housing an aerosol generating substrate and a product identifying compound associated with the container. The system further includes an electronic article configured to receive the container. The electronic article includes a sensor configured to detect the product identifying compound.

Examples of the invention describe electronic articles that include a sensor configured to detect a chemical signature associated with a consumable aerosol generating substrate. The electronic articles can be smoking articles, pharmaceutical delivery articles, or other articles for delivering an aerosol from an aerosol-generating substrate to a user.

Various aspects of the present invention may have one or more advantages relative to currently available or previously described electronic articles and systems. For example, the use of a product identifying compound to serve as a chemical fingerprint to identify a container housing an aerosol generating substrate that is detectable by the electronic article provides an alternative solution to authentication. Further, if the product identifying compound is present at levels detectable by the electronic article for a limited amount of time, repeated or extended use of the container can result in loss of its chemical fingerprint. For example, amounts of the product identifying compound associated with the container can decrease over time if the product identifying compound is volatile and dissipates. Preferably, amounts of the product identifying compound associated with the container dissipate to levels below detection by a sensor of the smoking article within an amount of time less than a typical amount of time for a single use of the container. Thus according to some aspects of the present invention, verification of authenticity can be limited to a single use of the container. If the electronic article is configured to lock out use if the chemical fingerprint (product identifying compound) is not detected and the system is configured to limit detection to a single use, refilling of containers by consumers could be prevented, which could thereby ensure reproducible quality of the experience by ensuring that the aerosol generating substrate in the container is formulated to manufacture specifications. These and other advantages of various aspects of the present invention will be evident to those of skill in the art upon reading and understanding the present disclosure.

The present invention is applicable to any suitable electronic article. As used herein, an "electronic article" is an article that has one or more electrical components. Preferably, at least some of the one or more electrical components control delivery of an aerosol from an aerosol generating substrate to a user. The electrical components can include a substrate heater, which can include, for example, one or more electrically resistive elements or can include an electrically controllable valve positioned and configured to allow or prevent passage of an aerosol generated from the substrate to the user. Control of a heater, a valve or other electrical component can be accomplished by control electronics. Control electronics can be provided in any suitable form and may, for example, include a controller or a memory and a controller. The controller can include one or more of an Application Specific Integrated Circuit (ASIC) state machine, a digital signal processor, a gate array, a microprocessor, or equivalent discrete or integrated logic circuitry. Control electronics can include memory that contains instructions that cause one or more components of the control electronics to carry out a function or aspect of the control electronics. Functions attributable to control electronics in this disclosure can be embodied as one or more of software, firmware, and hardware.

In some embodiments, the electronic article is a smoking article. As used herein, a "smoking article" is an article that is configured to deliver a nicotine-containing aerosol to a user using the article. The nicotine-containing aerosol can be generated from any suitable aerosol generating substrate. For example, the substrate can include tobacco. In some embodiments, the substrate includes a liquid composition comprising nicotine. In some embodiments, the substrate comprises a dry powder containing nicotine, such as a nicotine salt. A "smoking article" or other aerosol generating article described herein includes articles that heat, directly or indirectly, the aerosol generating substrate to produce the aerosol and articles that do not heat the substrate but rather use air flow or a chemical reaction to deliver aerosol.

It will be appreciated that an article that does not include control electronics can be readily modified to incorporate control electronics, such as a controllable valve, to carry out one or more embodiments of the present invention.

An electronic article according to the present invention includes a sensor configured to detect a product identifying compound associated with an aerosol generating substrate for use with the article. The product identifying compound can be associated with a container for housing the aerosol generating substrate. As used herein, a product identifying compound "associated with a container" is a product identifying compound that is on or in the container or on or in a substrate housed within the container.

Any appropriate compound can be used as a product identifying compound. Preferably, the product identifying compound is not otherwise present in the container or the substrate housed in the container to allow for detection of the compound among the background of the container and the substrate. Preferably, a product identifying compound is a compound that would not be expected to be present in an environment in which an electronic article would be used so that detection of the product identifying compound is indicative of the product (the container housing the aerosol generating substrate) rather than background amounts of the compound in the environment. Preferably, the product identifying compound is volatile or is carried in a volatile carrier such as, for example, a volatile solvent. If the product identifying compound is volatile or carried in a volatile carrier, the compound can be transported from the container or the substrate to the sensor on the electronic article, and thus can be detected by the sensor. If the product identifying compound is volatile or carried in a volatile carrier, the compound can dissipate from the container or substrate to levels below the limit of detection of the sensor. Preferably, amounts of the product identifying compound associated with the container dissipate to levels below detection by a sensor of the smoking article within an amount of time less than a typical amount of time for a single use of the container. Thus according to some preferred embodiments of the present invention, verification of authenticity can be limited to a single use of the container. To prevent excessive premature loss of a product identifying compound during, for example, storage of the container prior to use, the container can be sealed in a package through which the product identifying compound has little or no permeability.

Non-limiting examples of product identifying compounds that can be employed in accordance with the teachings presented herein include isomeric compounds, such as xylene isomers, and amine-containing compounds.

Preferably, the product identifying compound is present at a sufficiently low concentration that it is not perceivable by a user but is present at a concentration that is sufficiently high to be detected by a sensor of the electronic article. The distance of the source of the product identifying compound from the sensor and the sensitivity of the sensors are factors that can affect the desired concentration of the product identifying compounds.

In some embodiments, the sensors are capable of detecting product identifying compounds in the picogram ($10^{-12}$) range, femtogram ($10^{-15}$) range, or the attogram ($10^{-18}$) range. Accordingly, product identifying compounds can be detected by the sensor even when the source of the product identifying compound is at a very low concentration and at a relatively large distance from the sensor. In some embodiments, the source of the product identifying compound is positioned such that when the container is received by the electronic article, the source is at a distance from 100 millimetres to 150 millimetres from the sensor.

The product identifying compound can be associated with the container in which an aerosol generating substrate is disposed in any suitable manner. Preferably, the product identifying compound can be present on a housing forming the container. The compound can be present on the inside or the outside of the housing. Preferably, the compound is positioned on the container at a position that will place the compound in proximity to a sensor of the electronic article when the container is received by the electronic article. The product identifying compound can be placed on or in a reservoir that is part of the housing of the container or that is attached to the housing of the container. For example, the compound or a composition comprising the compound can be blotted on paper or other suitable material that can be affixed to the container. In some embodiments, the container comprises paper on which the compound or a composition comprising the compound can be blotted. For example, if the aerosol generating substrate is a rod of tobacco, the container may be a wrapper, such as a paper wrapper, disposed around the rod.

In some embodiments, more than one product identifying molecule can be associated with the container housing the aerosol generating substrate. An increased number of product identifying molecules can result in a product that is more difficult to counterfeit or that can provide additional information regarding the product. For example, if a manufacturer of containers of aerosol generating substrates manufactures a product line of containers housing 15 different compositions of aerosol generating substrates for use in a compatible electronic article, the manufacture may choose to associate some combination of one or more of five different product identifying compounds with each container so that containers for each product line can have a unique chemical fingerprint defined by the combination of product identifying compounds. A corresponding compatible electronic article would preferably have five different sensors for separately detecting one of the five product identifying compounds. Data obtained from the sensor regarding the presence or absence the various product identifying compounds could be used by the electronic article to determine the identity of the contents of the container.

In addition or alternatively to the use of multiple product identifying compounds, any other suitable identifier can be associated with a container housing an aerosol generating substrate. For example, an RFID tag can be associated with the container to indicate the identity of the container or the container and its contents. The use of an RFID tag and a product identifying compound in accordance with the present invention can result in a product (container housing substrate) that is more difficult to counterfeit than a product that includes only an RFID tag for purposes of authentication. In some embodiments, an electronic article can detect an RFID tag associated with a container and detect a product identifying compound associated with the container and use information from the RFID tag to perform a coherence check to verify that the product identifying compound is the compound that is supposed to be associated with the container. Such a coherence check can serve as an additional barrier to counterfeiters.

An electronic article in accordance with the present invention can include any suitable sensor for detecting a product identifying compound associated with a container housing an aerosol generating substrate. Preferably, the sensor is an electrochemical sensor. Any suitable electrochemical sensor can be employed. Preferably, the sensor includes a product identifying compound-sensitive coating disposed on a transducer, where selective binding of the product identifying compound to the coating is translated to a signal or change in signal by the transducer. For example, binding of the product identifying compound can result in a change in frequency, current or voltage, which can be correlated to the presence or an amount of the product identifying compound. In some embodiments, mass change of the coating results in changes in resonance frequency of the transducer, which translates into a proportional electrical signal. For purposes of the present invention, a "coating," as it relates to a sensor, is a coating, layer, or film.

In embodiments where more than one product identifying compound is associated with a container that houses an aerosol generating substrate, the electronic article can have more than one sensor. For example, the electronic article can include one sensor for each product identifying compound that may be associated with a container. For example if a product line of containers may include a combination of any one or more of five different product identifying compounds, an electronic article may include five sensors, each configured to detect a different product identifying compound, even if any given container in the product line may contain less than five different product identifying compounds.

Preferably, a product identifying compound sensor for use in an electronic article of the present invention is a RFID tag sensor that includes a RFID tag and a product identifying compound-sensitive coating operably coupled to the RFID tag. RFID sensors can advantageously be passive, requiring no battery power to be used by the sensor. An RFID sensor can be interrogated by a powered RFID reader as known in the art. In many embodiments, a resonance frequency of the RFID sensor changes as a product identifying compound binds to the coating. The RFID reader can sweep the sensor to determine the resonance frequency of the tag, which can correlate to the amount of product identifying compound present. The RFID reader can, in some embodiments, be configured to interrogate the RFID tag of the sensor at one or more discrete frequencies, such as the resonance frequency of the sensor without bound analyte (product identifying compound) or an expected resonance frequency of the sensor with bound analyte.

An electronic article can include any suitable number of RFID readers to obtain signals from one or more RFID sensors present in the article. In some embodiments, one RFID reader can interrogate and read more than one sensor. An RFID reader that is the same as, or different from, an RFID reader for reading and RFID sensor can be used to read an RFID tag, if included, associated with the container In some embodiments, binding of a product identifying compound to a coating of an RFID sensor can cause a portion of an antenna of the RFID sensor to open, such as to cut open or to be suppressed, which can modify the resonance frequency of the RFID tag to indicate presence of the product identifying compound.

Any suitable coating or layer can be disposed on a transducer, such an RFID tag or a printed circuit board, for detecting a product identifying compound. For example, chemiresistive or semiconductive materials, such as carbon nanotubes coated with a polythiophene, such as a calixarene-substituted type of material as host-guest chemistry, as well as graphene substrates impregnated with a with a polythiophene, will have a selective response to xylene molecules or derivatives or xylene molecules, and can be highly or ultra-sensitive and can demonstrate conductance changes detectable at room temperature and atmospheric pressure. Coating Carbon nanotubes (CNTs) or Single-walled Carbon Nanotubes (SWNTs, SWCNTs) with gold-hafnium can amplify the detection capabilities. By way of further example, carbon nanotube/metalloporphyrin composites can be used to detected amine-containing compounds/

Preferably the sensor is flexible if the electronic article is flexible or bendable. Examples of flexible sensors include carbon nanotube or graphene structure-based sensors.

Regardless of the product identifying compound detected, data obtained by a sensor of electronic article of the present invention can be used for any one or more suitable purpose, only a few of which are described in the present disclosure in more detail.

In preferred embodiments, an electronic article includes a product identifying compound sensor operably coupled to memory, such as RAM, to store data obtained from the sensor. Memory can be operably coupled to appropriate computing apparatus to analyse the sensor data to, for example, analyse whether the data is indicative of the presence of the product identifying compound. In addition or alternatively, the electronic article can include output apparatus to transfer stored sensor data to another device for display, analysis or display and analysis. Output apparatus can include output communication apparatus. Output communication apparatus can be wired or wireless communication apparatus. Wired output communication apparatus can include one or more ports, such as a USB port or a fire wire port, for operably coupling the electronic article to another computing apparatus, such as a smart phone or a computer. Wireless communication apparatus include telemetry, Bluetooth, infrared, or other wireless transmitters for operably coupling the electronic article to another computing apparatus, such as a smart mobile phone or a computer. The computer, smart mobile phone, or other computing apparatus can be used to receive data obtained from a sensor. The computing apparatus can then be used to analyse the sensed data. Computing apparatus, whether part of the electronic article or part of a remote device, can be used to provide information to a consumer. For example, audible, tactile, or visual feedback can be provided to the consumer that the cartridge is authentic and the device is ready for use or that the device has not been detected as being authentic and the device is not ready for use.

In some embodiments, data obtained by a sensor of an electronic article according to the present invention can be provided to a centralized data centre, the value of the container read by the electronic article will be kept in memory by the electronic article and communicated, possibly with other values including an electronic article identifier, to the centralized data centre. Such process could help to further prevent counterfeit in case counterfeiters were able to forge a counterfeit RFID tag with an existing compatible container identifier, by communicating to electronic articles black listed container identifiers.

In preferred embodiments, an electronic article includes a product identifying compound sensor operably coupled to control electronics configured to control delivery of an aerosol from the electronic article. Preferably, the control electronics are configured to control delivery of the aerosol based on data received from the sensor. For example, if the container is authenticated and the contents of the container are identified, the control electronics can tailor the delivery or generation and delivery of an aerosol based on the contents of the container. In some embodiments, the control electronics are configured to prevent the article from delivering an aerosol from the article based on data received from the sensor. For example, if a product identifying compound is not detected by a sensor, the control electronics may prevent delivery of the aerosol from the device.

In some embodiments where the electronic article is configured to prevent delivery of an aerosol, the electronic article includes a controllable valve operably coupled to a product identifying compound sensor. The valve can be positioned along a flow path that extends from the aerosol generating substrate to a mouth end of the electronic article. The valve can be configured to adapt default a configuration, such as closed, to prevent delivery of aerosol to a user unless the product identifying compound (or appropriate combination of compounds) is detected. Alternatively, the valve can be configured to adapt a default configuration, such as open, to allow delivery of aerosol to a user, and if a product identifying compound is not detected, the valve can adapt a configuration to prevent delivery of the aerosol.

In some embodiments where the electronic article is configured to prevent delivery of an aerosol, the electronic article includes a heater configured to heat a substrate to generate an aerosol to be delivered to a user. The heater can be operably coupled to a product identifying compound sensor. The heater may be prevented from being activated unless a product identifying compound is detected by the sensor. Alternatively, the heater may be configured to adapt a default configuration of being activated, and if a product identifying compound is not detected, the heater can be inactivated. In such cases, some amount of aerosol may be available for delivery to user due to prior heating of the substrate.

In some embodiments, an electronic article includes a heater configured to heat a substrate to generate an aerosol to be delivered to a user and includes a controllable valve, such as a valve as discussed above.

Alternatively or in addition to preventing an amount of aerosol from being delivered from the electronic article, control electronics of the electronic article can be operably coupled to alarm apparatus to provide an alert that a product identifying compound has not been detected. Alarm apparatus may include, for example, apparatus that when activated cause the electronic article to vibrate, a speaker to provide an audible sound, led lights that can flash, and a display for presenting a warning. Alternatively, the alarm apparatus can be external to the electronic article and coupled to output apparatus of the electronic article. Alarm apparatus can include, for example, a smart mobile phone.

It will be understood that the preferred embodiments described herein can be combined in any suitable matter. For example, an electronic article configured to prevent delivery of an aerosol when a product identifying compound is not detected can also be configured to one or both of store and output information regarding data obtained by a product identifying compound sensor.

In some embodiments, an electronic article of the present invention includes one or more components that cause sensor detection components to be activated when a container housing the substrate is received by the electronic article. For example, the electronic article may include a switch that is positioned and actuated when the container is received by the electronic article. Actuation of the switch can cause the one or more sensor detection components to be activated. Such activation of the detection components can serve to save power, such as battery power, by not causing power to be diverted to the detection components when not needed. In some embodiments, the one or more detection components are deactivated after a certain period of time even of the substrate or container are not removed from the housing.

In addition or alternatively, the one or more detection components can be activated on a time frequency basis, rather than always remaining activated. In addition or alternatively, the one or more detection components can be activated when a user takes a puff from the electronic article. In such embodiments, puff detection components can be operably coupled to sensor detection components, such as RFID readers. An electronic article of the present invention can include any suitable puff detection component such as a microphone, a thermocouple, or those described in, for example WO 2013/098398 or WO 2010/003480.

In some preferred embodiments, an electronic article as described herein is an electronic smoking article. The electronic smoking article can be any suitable smoking article. In some embodiments where the electronic smoking articles employ heated but not burned tobacco consumables and have a main unit and a tobacco stick holder for receiving the consumable container, such as a tobacco rod, an RFID tag sensor can be incorporated, for example, in the tobacco stick holder. An RFID reader can be included in, for example, the main unit. In some embodiments where the smoking articles are electronic cigarettes or vaping systems that employ cartridges or the like as consumables with liquid compositions containing nicotine, the sensors can be directly incorporated in the electronics of the device. It will be understood that other suitable configurations are contemplated herein and are readily achievable based on the disclosure presented herein.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Referring now to the drawings, in which some aspects of the present invention are illustrated. It will be understood that other aspects not depicted in the drawings fall within the scope and spirit of the present invention. The drawings are schematic drawings and are not necessarily to scale. Like numbers used in the figures refer to like components, steps and the like. However, it will be understood that the use of a number to refer to a component in a given figure is not intended to limit the component in another figure labelled with the same number. In addition, the use of different numbers to refer to components in different figures is not intended to indicate that the different numbered components cannot be the same or similar to other numbered components.

Figure 1:
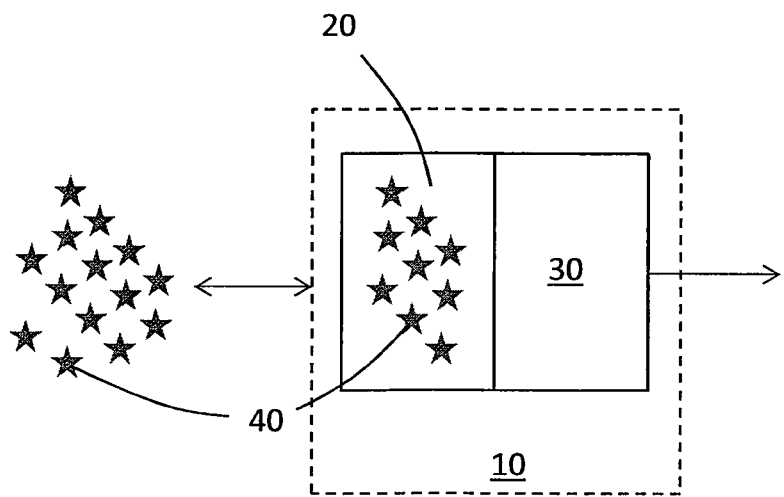
FIG. 1 is a schematic diagram depicting an electrochemical sensor and scheme for transducing a signal related to an amount or concentration of a molecule detected by the sensor.

Referring now to FIG. 1, an electrochemical sensor 10 in accordance with various embodiments of the present invention can include a transducer 30 and a coating 20 or layer disposed on the transducer. The coating 20 specifically or selectively interacts with a molecule 40 via, for example, a physiochemical reaction. The transducer 30 outputs a signal based on, for example, the mass of the metabolite 40 present in the coating 20. In embodiments, the signal output is a signal in response to an interrogation. The transducer 30 can be an RFID tag.

Figure 2:
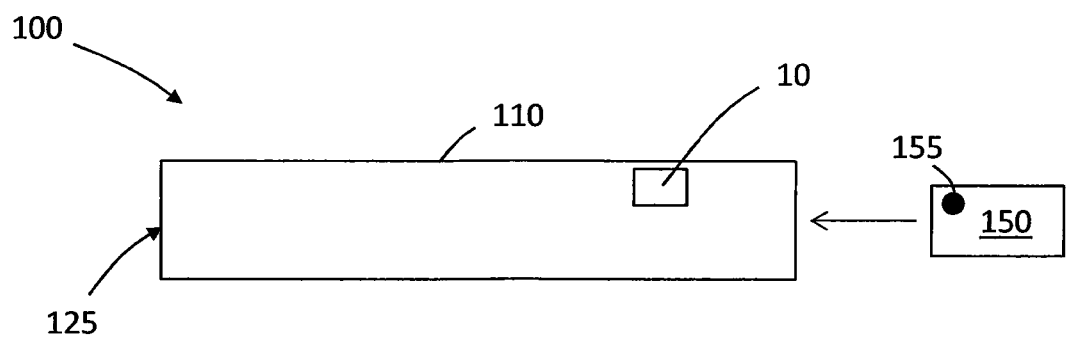
FIGS. 2-3 are schematic diagrams side views of an electronic article according to various embodiments of the present invention.

Referring now to FIG. 2, an electronic article 100 in accordance with various embodiments of the present invention includes a housing 110. The housing 110 may be formed of a single piece or multiple interconnected pieces. The housing 110 defines a mouth end 125. The housing 110 is configured to receive a container 150 housing an aerosol generating substrate. While depicted in FIG. 2 as receiving the container 150 at an end opposite the mouth end 125, the housing 110 may be configured to receive the substrate 150 at any suitable location. One or more product identifying compounds 155 are associated with container 150. The electronic article 100 includes one or more sensors 10 for detecting the one or more product identifying compounds 155 associated with the container. One or more electrical components (not shown in FIG. 2), some of which can be operably coupled to sensor 10, can be disposed in the housing 110.

Figure 3:
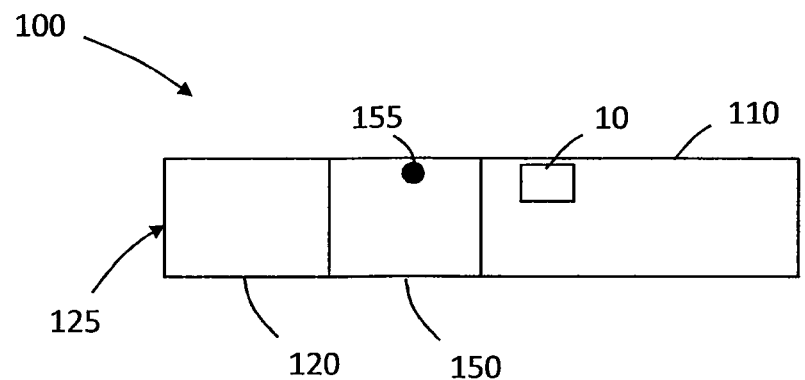

Referring now to FIG. 3, an electronic article 100 in accordance with various embodiments of the present invention includes a housing 110 that has a mouthpiece 120 and is configured to receive a container 150 containing an aerosol generating substrate. The container 150 forms part of a multi-part housing 110. The mouthpiece 120 defines a mouth end 125. One or more product identifying compounds 155 are associated with container 150. The electronic article 100 includes one or more sensors 10 for detecting the one or more product identifying compounds 155 associated with the container. One or more electrical components (not shown in FIG. 3), some of which can be operably coupled to sensor 10, can be disposed in the housing 110.

Figure 4:
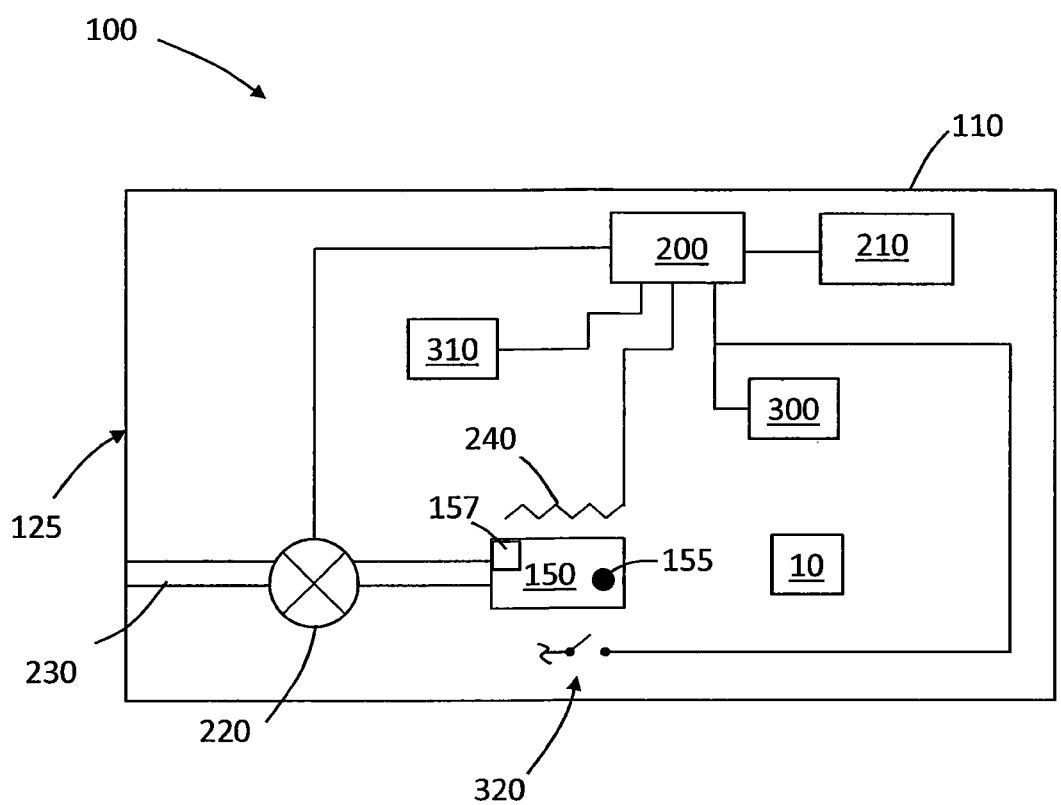
FIG. 4 is a schematic diagram illustrating some components of an electronic article according to various embodiments of the present invention.

Referring now to FIG. 4, an electronic article 100 in accordance with various aspects of the present invention includes a housing 110 configured to receive a container 150 housing an aerosol generating substrate. The housing 110 includes a mouth end 125. One or more product identifying compounds 155 are associated with container 150. The electronic article 100 includes a product identifying compound sensor 10, which is an RFID sensor in the depicted embodiment. The electronic article 100 includes a power source 210 operably coupled to control electronics 200. Power source 210 can be any suitable power source, such as a battery, a capacitor, or the like. Preferably, the power source 210 is a rechargeable battery, such as a rechargeable lithium ion battery, a rechargeable nickel-cadmium battery, or the like.

In the embodiment depicted in FIG. 4, the control electronics 200 are operably coupled to sensor 10 via RFID reader 300. Control electronics 200 are also operably coupled to valve 220 and heater 240 in the depicted embodiment. Valve 220 is positioned along a pathway 230 that extends from container 150 to mouth end 125 through which aerosol generated by substrate can be transported. Valve 220 can adapt an open or closed configuration to allow or prevent the aerosol from traveling from substrate housed in container 150 to mouth end 125. Valve 220 can be controlled by control electronics 200 which can instruct valve whether to adapt the open or closed configuration based on data received from sensor 10.

Heater 240 is positioned in contact with or in proximity to container 150 and is configured to heat substrate to cause an aerosol to be generated by the substrate. Heater 240 can be controlled by control electronics 200 so that the extent of heating of the substrate can be controlled based on data received from sensor 10.

In the embodiment depicted in FIG. 4, the electronic article 100 includes a second RFID reader 310 configured to interrogate and determine the resonance frequency of RFID tag 157 disposed on container 150. In some embodiments, one RFID reader 300, 310 can read both RFID tag of sensor 10 and RFID tag 157 of container 150.

The depicted electronic article 100 also includes a switch 320 that is actuated by receipt of the container 150 by the housing 110. The switch 320, when actuated, can activate RFID reader 300.

Figure 5:
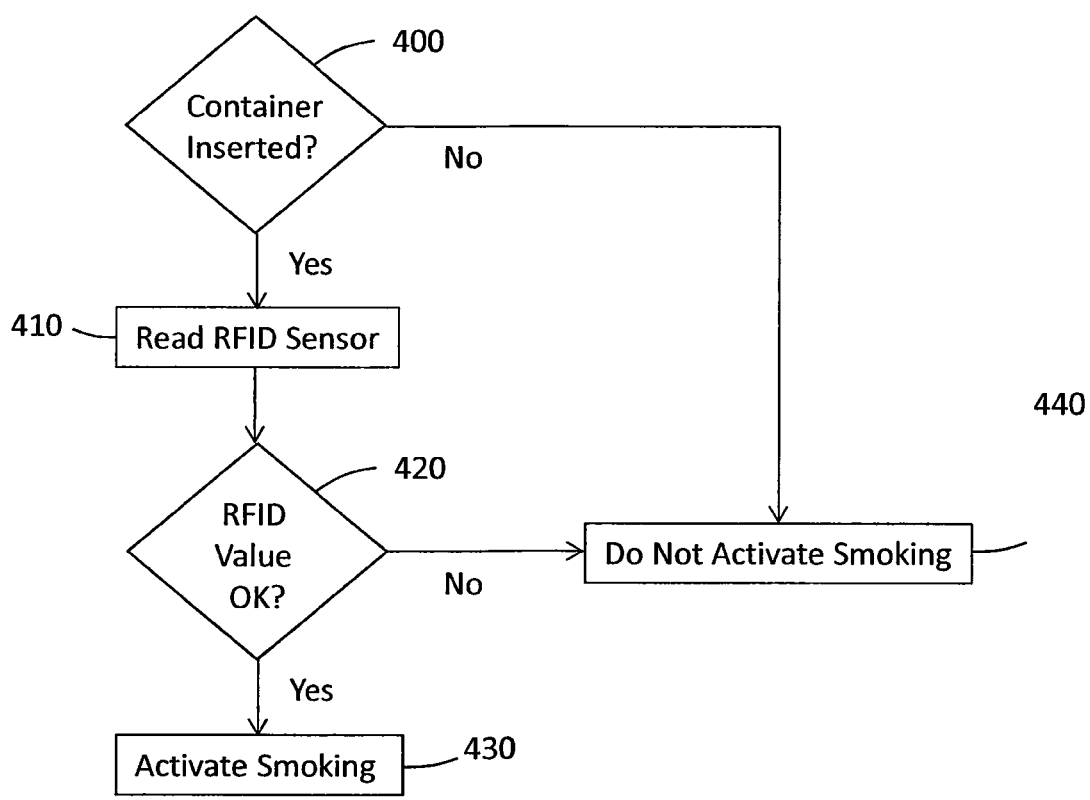
FIG. 5 is a flow chart illustrating aspects of a process that can be carried out by an electronic article in accordance with various aspects of the present invention.

Referring now to FIG. 5, a flow diagram is shown illustrating a process that can be carried out by an electronic article or system according to various embodiments of the present invention. At step 400, a determination is made as to whether a container containing an aerosol generating substrate is inserted into the electronic article. This can be determined by, for example, determining whether switch 320 as depicted in FIG. 4 is actuated. If the container is not inserted, the electronic article is not activated (440). If the substrate is inserted, the one or more sensor reading components are activated to read the RFID sensor (410), such as RFID sensor 10 as depicted in FIG. 4. A determination is then made as to whether the value obtained by the RFID sensor is indicative of the presence of a product identifying compound (420). If the RFID value is not indicative of the presence of a product identifying compound, the electronic article is not activated (440). Determination (420) can be made by, for example, control electronics 200 as depicted in FIG. 4. If the RFID value is appropriate, control electronics can, for example, activate the electronic device. Activation of the electronic device can include activation of a heater (such as heater 240 depicted in FIG. 4), activation of a valve (such as valve 220 depicted in FIG. 4), or activation a heater and a valve to allow an aerosol from a substrate to be delivered to a user (such as through pathway 230 as depicted in FIG. 4).

Thus, methods, systems, devices, compounds and compositions for PRODUCT RECOGNITION IN AEROSOL GENERATING DEVICES are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in electronic article manufacturing or related fields are intended to be within the scope of the following claims.

The invention claimed is:
1. A system comprising:
a container housing an aerosol generating substrate;
a product identifying compound associated with the container; and
an electronic article comprising an RFID reader and a sensor configured to detect the product identifying compound,
wherein the electronic article is configured to receive the container, and wherein the sensor comprises an RFID tag;
wherein the RFID reader is configured to receive a signal from the RFID tag.

2. The system of claim 1, wherein the electronic article comprises a memory operably coupled to the sensor and configured to store data received from the sensor.

3. The system of claim 1, wherein the electronic article comprises control electronics configured to control delivery of an aerosol generated from the aerosol generating substrate, wherein the control electronics are operably coupled to the sensor, and wherein the control electronics are configured to control the delivery of the aerosol based on data received from the sensor.

4. The system of claim 3, wherein the control electronics are configured to prevent delivery of the aerosol if the data received from the sensor is indicative of the absence of the product identifying compound.

5. The system of claim 3, wherein the control electronics are further configured to identify the aerosol generating substrate received by the housing and wherein the control electronics are further configured to control the delivery of the aerosol based on the identity of the substrate.

6. The system of claim 3, further comprising a heater positioned and configured to heat the aerosol generating substrate to produce the aerosol.

7. The system of claim 6, wherein the heater is operably coupled to the control electronics and wherein the control electronics are configured to control the extent to which the heater heats the substrate to control the amount of aerosol generated.

8. The system of claim 3, wherein the control electronics include a controllable valve positioned along a flow path between a mouth end of the smoking article and the aerosol generating substrate, wherein the valve is configured to adapt a configuration that allows flow of the aerosol from the substrate to the mouth end and to adapt a configuration that prevents flow of the aerosol from the substrate to the mouth end.

9. The system of claim 3, wherein receipt of the container by the smoking article causes activation of one or more components of the control electronics that are configured to receive data from the sensor.

10. The system of claim 9, further comprising a switch positioned and configured to be actuated when the container is received by the smoking article, and wherein actuation of the switch causes activation of the one or more components of the control electronics that are configured to receive data from the sensor.

11. The system of claim 1, wherein the aerosol generating substrate housed in the container is a nicotine-containing aerosol generating substrate.

12. The system of claim 11, wherein the substrate comprises one or more of a composition comprising tobacco, a nicotine-containing liquid composition and a nicotine-containing dry powder.

13. The system of claim 1, wherein the electronic article is a smoking article.

14. The system of claim 1, wherein the product identifying compound comprises a volatile compound or the product identifying compound is in a volatile carrier.

\* \* \* \* \*